(12) United States Patent
Steimer

(10) Patent No.: US 7,105,948 B2
(45) Date of Patent: Sep. 12, 2006

(54) APPARATUS FOR THE VOLTAGE MAINTENANCE OF AN ELECTRICAL AC VOLTAGE SUPPLY NETWORK AND METHOD FOR OPERATING SUCH AN APPARATUS

(75) Inventor: Peter Steimer, Unterehrendingen (CH)

(73) Assignee: ABB Schweiz AG, Baden (CH)

( * ) Notice: Subject to any disclaimer, the term of this patent is extended or adjusted under 35 U.S.C. 154(b) by 557 days.

(21) Appl. No.: 10/237,874

(22) Filed: Sep. 10, 2002

(65) Prior Publication Data

US 2004/0046460 A1    Mar. 11, 2004

(51) Int. Cl.
*H02J 3/28*    (2006.01)

(52) U.S. Cl. ......................................... 307/46; 307/103
(58) Field of Classification Search ................. 307/66, 307/46, 80, 82, 103; 363/73, 37, 132
See application file for complete search history.

(56) References Cited

U.S. PATENT DOCUMENTS

| | | | | |
|---|---|---|---|---|
| 4,410,935 A | * | 10/1983 | Dang | 363/37 |
| 4,502,106 A | * | 2/1985 | Glennon | 363/132 |
| 4,507,724 A | * | 3/1985 | Glennon | 363/132 |
| 4,620,272 A | * | 10/1986 | Fulton et al. | 363/37 |
| 4,666,020 A | * | 5/1987 | Watanabe | 307/66 |
| 5,099,410 A | | 3/1992 | Divan | |
| 5,416,686 A | * | 5/1995 | Azuma et al. | 363/37 |
| 5,450,309 A | * | 9/1995 | Rohner | 307/82 |
| 6,069,809 A | * | 5/2000 | Inoshita | 363/132 |
| 6,175,166 B1 | * | 1/2001 | Bapat | 307/64 |
| 6,437,996 B1 | * | 8/2002 | Wobben | 363/37 |

* cited by examiner

*Primary Examiner*—Brian Sircus
*Assistant Examiner*—Andrew Deschere
(74) *Attorney, Agent, or Firm*—Buchanan Ingersoll PC

(57) ABSTRACT

A method and apparatus for the voltage maintenance of an electrical AC voltage supply network comprising a partial converter system, which has a first branch pair and a second branch pair connected in parallel therewith and an electrical energy store connected in parallel with the branch pairs. Each branch pair is formed from two series-connected driveable power semiconductor switches, each with a diode reverse-connected in parallel, and the junction point of the power semiconductor switches of the first branch pair forming a first terminal and the junction point of the power semiconductor switches of the second branch pair forming a second terminal. The partial converter system has a third branch pair connected in parallel with the first and second branch pairs. The junction point of the power semiconductor switches of the third branch pair forms a third terminal.

35 Claims, 4 Drawing Sheets

APPARATUS FOR THE VOLTAGE MAINTENANCE OF AN ELECTRICAL AC VOLTAGE SUPPLY NETWORK AND METHOD FOR OPERATING SUCH AN APPARATUS

FIELD

The present invention was made with government support under Agreement No. N00014-99-3-0002 awarded by the Office of Naval Research. The government has license rights in the invention.

TECHNICAL FIELD

The present invention is concerned with the field of power electronics. It relates to an apparatus for the voltage maintenance of an electrical AC voltage supply network and to a method for operating such an apparatus in accordance with the preamble of the independent claims.

BACKGROUND

Conventional apparatuses, in particular converter circuits, as are used nowadays to compensate for voltage dips in the voltage of an electrical single-phase or polyphase AC voltage supply network, as may occur on account of short circuits or load changes, are customarily connected in between the voltage source or the voltage sources of the electrical AC voltage supply network and an electrical load. Such an apparatus for the voltage maintenance of an electrical AC voltage supply network is specified in U.S. Pat. No. 5,099,410, for example, wherein a partial converter system is specified which has a first branch pair and a second branch pair connected in parallel therewith, each branch pair being formed from two series-connected driveable power semiconductor switches with in each case a diode reverse-connected in parallel with each power semiconductor switch. The junction point of the power semiconductor switches of the first branch pair furthermore forms a first terminal of the partial converter system, the electrical load usually being connected to the first terminal. Furthermore, the junction point of the power Semiconductor switches of the second branch pair forms a second terminal of the partial converter system, to which the voltage source of the electrical AC voltage supply network is customarily connected. Moreover, an electrical energy store formed from two series-connected capacitors is provided.

The apparatus according to U.S. Pat. No. 5,099,410 is embodied for a single-phase electrical AC voltage supply network and serves, on the one hand, for voltage boosting, in particular for voltage doubling for feeding the electrical load and, on the other hand, as an apparatus for the uninterruptible feeding of the load, the partial converter system being driven, in the event of a fall in voltage of the voltage source, in such a way that essentially the rated voltage of the voltage source is established at the load connected to the first terminal of the partial converter system.

What is problematic in the case of the apparatus in accordance with U.S. Pat. No. 5,099,410 is that although, in the event of a fall in the voltage of the voltage source, uninterruptible feeding of the electrical load is made possible by voltage backup, this backup of the dropped voltage is possible only for a short time of a few milliseconds. Although this time can be lengthened by designing the electrical energy store to have a large capacitance or by means of an additional energy store in the form of a capacitor or a battery, such a design of the energy store or the provision of an additional energy store causes a considerable space requirement and an increased outlay on material, mounting and busbar arrangement.

SUMMARY OF THE INVENTION

It is an object of the invention, therefore, to specify an apparatus for the voltage maintenance of an electrical AC voltage supply network which, in the event of a fall in the voltage of a voltage source of the electrical AC voltage supply network, enables a backup of the dropped voltage for a long period of time and, moreover, has a particularly simple and cost-effective construction, so that the space requirement and the apparatus outlay on material, mounting and busbar arrangement are minimized. Furthermore, the intention is to specify a method by which the apparatus according to the invention can be operated particularly simply and efficiently. These objects are achieved by means of the features of claims 1 and 17. Advantageous developments of the invention are specified in the subclaims.

In the case of the invention's apparatus for the voltage maintenance of an electrical AC voltage supply network, a partial converter system is provided which has a first branch pair and a second branch pair connected in parallel therewith and an electrical energy store connected in parallel with the branch pairs, each branch pair being formed from two series-connected driveable power semiconductor switches with in each case a diode reverse-connected in parallel with each power semiconductor switch. The junction point of the power semiconductor switches of the first branch pair furthermore forms a first terminal of the partial converter system. Furthermore, the junction point of the power semiconductor switches of the second branch pair forms a second terminal of the partial converter system. According to the invention, the partial converter system has a third branch pair formed from two series-connected driveable power semiconductor switches with in each case a diode reverse-connected in parallel with each power semiconductor switch, the third branch pair being connected in parallel with the first and second branch pairs, and in that the junction point of the power semiconductor switches of the third branch pair forms a third terminal of the partial converter system. The second and third branch pairs advantageously make it possible, in the event of a fall in the voltage of a—for example perturbed—voltage source of the electrical AC voltage supply network to which the partial converter system is connected by the second and third terminals, still to draw electrical energy for charging the electrical energy store from said faulty voltage source of the electrical AC voltage supply network, while by means of the first and second branch pairs the voltage at the first terminal is backed up by drawing electrical energy from the electrical energy store and, consequently, it is possible to ensure a supply of an electrical load connected to the first terminal for a long period of time. It is thus advantageously possible to dispense with designing the electrical energy store to have a large capacitance or with an additional energy store in the form of a capacitor or a battery, as is known from the prior art, so that the apparatus according to the invention furthermore manages with a small space requirement, is distinguished by a small outlay on material, mounting and busbar arrangement and, consequently, is very simple, does not require intensive maintenance, and is cost-effective.

In the case of the invention's method for operating the apparatus for the voltage maintenance of an electrical AC voltage supply network, in the event of a fall in voltage of the voltage source of the electrical AC voltage supply network, said voltage source being connected to the partial converter system, the first and second branch pairs of the partial converter system are driven in such a way that essentially the rated voltage of the voltage source is established at the first terminal of the partial converter system This setting is advantageously achieved by the fact that a compensation voltage is impressed between the first terminal and the second terminal of the partial converter system, which can compensate for the fall in voltage. According to the invention, moreover, the second and third branch pairs are driven in such a way that the electrical energy store is charged by the voltage source. The charging operation and the compensation of the fall in voltage advantageously proceed essentially at the same time. What can advantageously be achieved by this driving of the first, second and third branch pairs is that, on the one hand, electrical energy for charging the energy store can still be drawn from the faulty voltage source with its resultant fall in voltage, while the setting of the voltage at the first terminal to essentially the value of the rated voltage of the voltage source advantageously results in a voltage backup which makes it possible to ensure the supply of the electrical load connected to the first terminal for a long period of time. As a result, the method according to the invention enables particularly simple and efficient operation of the apparatus according to the invention.

These and further objects, advantages and features of the present invention will become apparent from the following detailed description of preferred exemplary embodiments of the invention in conjunction with the drawing.

Figure 1:
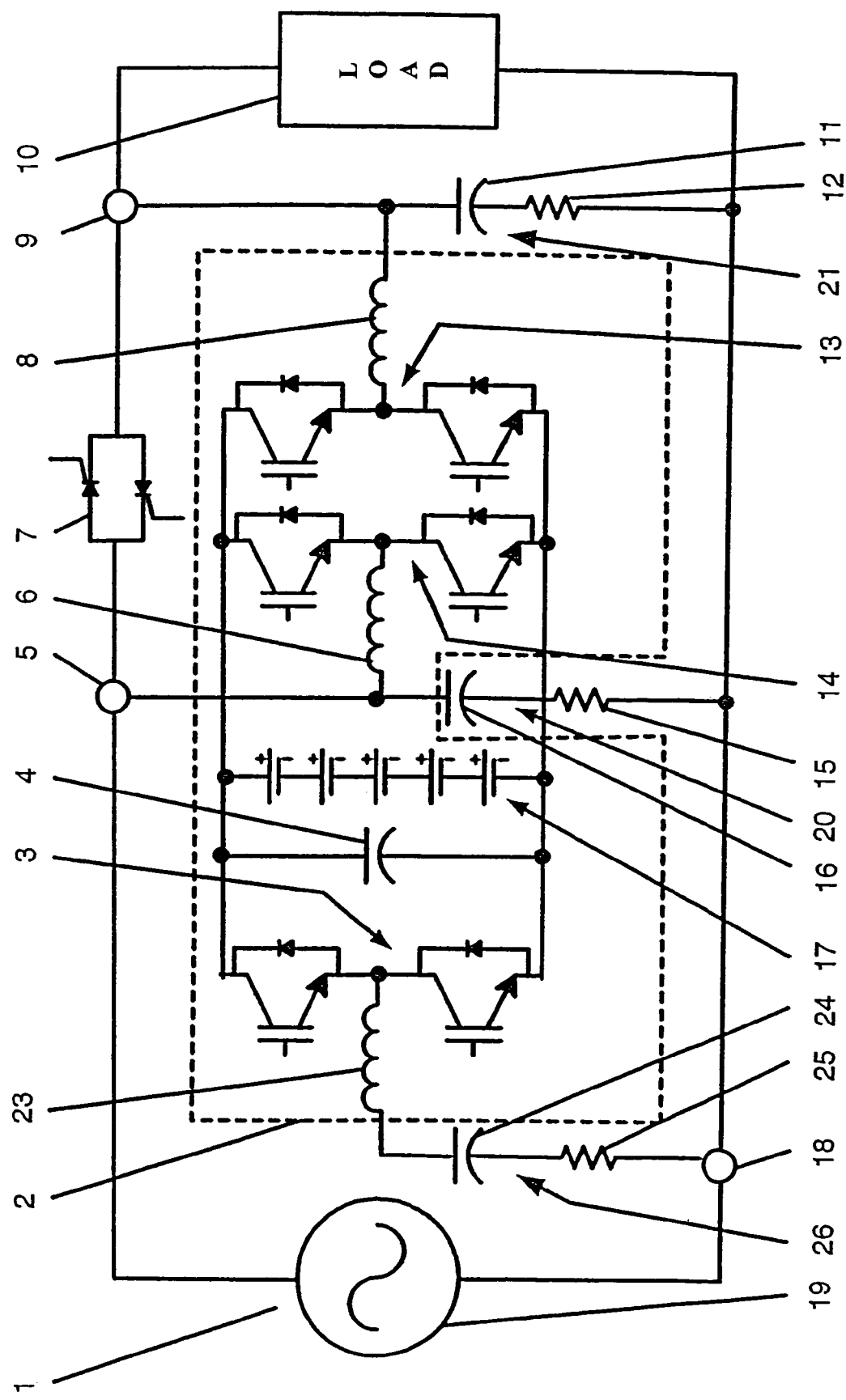
FIG. 1 shows a first embodiment of an apparatus according to the invention for the voltage maintenance of an electrical AC voltage supply network, in particular for a single-phase electrical AC voltage supply network.

The reference symbols used in the drawing and their meanings are summarized in the List of designations. In principle, identical parts are provided with identical reference symbols in the figures. The embodiments described represent examples of the subject matter of the invention and do not have a restrictive effect.

DETAILED DESCRIPTION OF THE PREFERRED EMBODIMENTS

FIG. 1 shows a first embodiment of an apparatus according to the invention for the voltage maintenance of an electrical AC voltage supply network 1, in particular for a single-phase electrical AC voltage supply network 1. In accordance with FIG. 1, the electrical AC voltage supply network 1 has an associated voltage source 19. In accordance with FIG. 1, a partial converter system 2 is provided, which has a first branch pair 13 and a second branch pair 14 connected in parallel therewith and an electrical energy store 4 connected in parallel with the branch pairs 13, 14, each branch pair 13, 14 being formed from two series-connected driveable power semiconductor switches with in each case a diode reverse-connected in parallel with each power semiconductor switch. A capacitor is preferably provided as electrical energy store 4, said capacitor representing a simplification and a space saving compared with the electrical energy store formed from two series-connected capacitors that is known from the prior art. Furthermore, the junction point of the power semiconductor switches of the first branch pair 13 forms a first terminal 9 of the partial converter system 2. Moreover, the junction point of the power semiconductor switches of the second branch pair 14 forms a second terminal 5 of the partial converter system 2.

According to the invention, the partial converter system 2 has a third branch pair 3, which is formed from two series-connected driveable power semiconductor switches with in each case a diode reverse-connected in parallel with each power semiconductor switch. In accordance with FIG. 1, the third branch pair 3 is connected in parallel with the first and second branch pairs 13, 14, the junction point of the power semiconductor switches of the third branch pair 3 forming a third terminal 18 of the partial converter system 2. In accordance with FIG. 1, an electrical load 10 is connected to the first terminal 9 and to the third terminal 18. Furthermore, the voltage source 19 is connected to the second terminal 5 and to the third terminal 18. What can advantageously be achieved by the second branch pair 14 and the third branch pair 3 is that, in the event of a fall in the voltage of the voltage source 19 on account of a fault or a disturbance of the voltage source 19, a certain amount of electrical energy can still be drawn from the latter and serves for charging the electrical energy store 4. At the same time, by means of the first and second branch pairs 13, 14, the voltage at the first terminal 9, and, in particular in the case of a single-phase electrical AC voltage supply network 1, between the first terminal 9 and the third terminal 18, can be backed up by the drawing of electrical energy from the electrical energy store 4, i.e. be set and held at essentially the value of the rated voltage of the voltage source 19, and, consequently, a supply of the electrical load 10 connected to the first terminal 9, and, in particular in the case of a single-phase electrical AC voltage supply network 1, to the first terminal 9 and to the third terminal 18, can be achieved and ensured for a long period of time. In addition, what can advantageously be achieved by the second branch pair 14 and the third branch pair 3 is that, in the event of a rise in the voltage of the voltage source 19 above the rated voltage of the voltage source 19 on account of a fault or a disturbance of the voltage source 19, an excess of electrical energy can be drawn from the latter and serves for charging the electrical energy store 4. At the same time, by means of the first and second branch pairs 13, 14, the voltage at the first terminal 9 can be set and held at essentially the value of the rated voltage of the voltage source 19, and, consequently, a supply of the electrical load 10 connected to the first terminal 9 can be achieved and ensured for a long period of time.

In accordance with FIG. 1, the apparatus according to the invention furthermore has a driveable isolating switch 7 connected in between the first terminal 9 and the second terminal 5. In normal operation of the electrical AC voltage supply network 1, i.e. when there is no fall in voltage of voltage source 19, the isolating switch 7 is closed, so that the first terminal 9 and the second terminal 5 are connected to one another and the electrical load 10 is advantageously directly connected to the voltage source 19 and is fed by the latter. Such direct feeding of the electrical load 10 by the voltage source 19 during normal operation of the AC voltage supply network 1 is not possible with the apparatus for voltage maintenance that is known from the prior art. Furthermore, according to the invention, a first inductance 6 is connected in between the junction point of the power semiconductor switches of the second branch pair 14 and the second terminal 5, which inductance advantageously serves for smoothing a current flowing via the second terminal 5. Furthermore, in accordance with FIG. 1, a second inductance 8 is connected in between the junction point of the power semiconductor switches of the first branch pair 13 and the first terminal 9, which inductance advantageously serves for smoothing a current flowing via the first terminal 9. Furthermore, in accordance with FIG. 1, a third inductance 23 is connected in between the junction point of the power semiconductor switches of the third branch pair 3 and the third terminal 18, which inductance advantageously serves for smoothing a current flowing via the third terminal 18.

In accordance with FIG. 1, the partial converter system has an electrical battery store 17 which is connected in parallel with the first, second and third branch pairs 13, 14, 3, which may optionally be provided and which serves to provide additional electrical energy, which makes it possible to achieve an advantageous further lengthening of the period of time of backup of the voltage at the first terminal 9 in the event of a fall in voltage or an excessive increase in voltage above the value of the rated voltage of the voltage source 19. As an alternative, the battery store 17 is advantageously formed by one or more capacitors having a very high capacitance, namely by so-called "supercaps".

Figure 2:
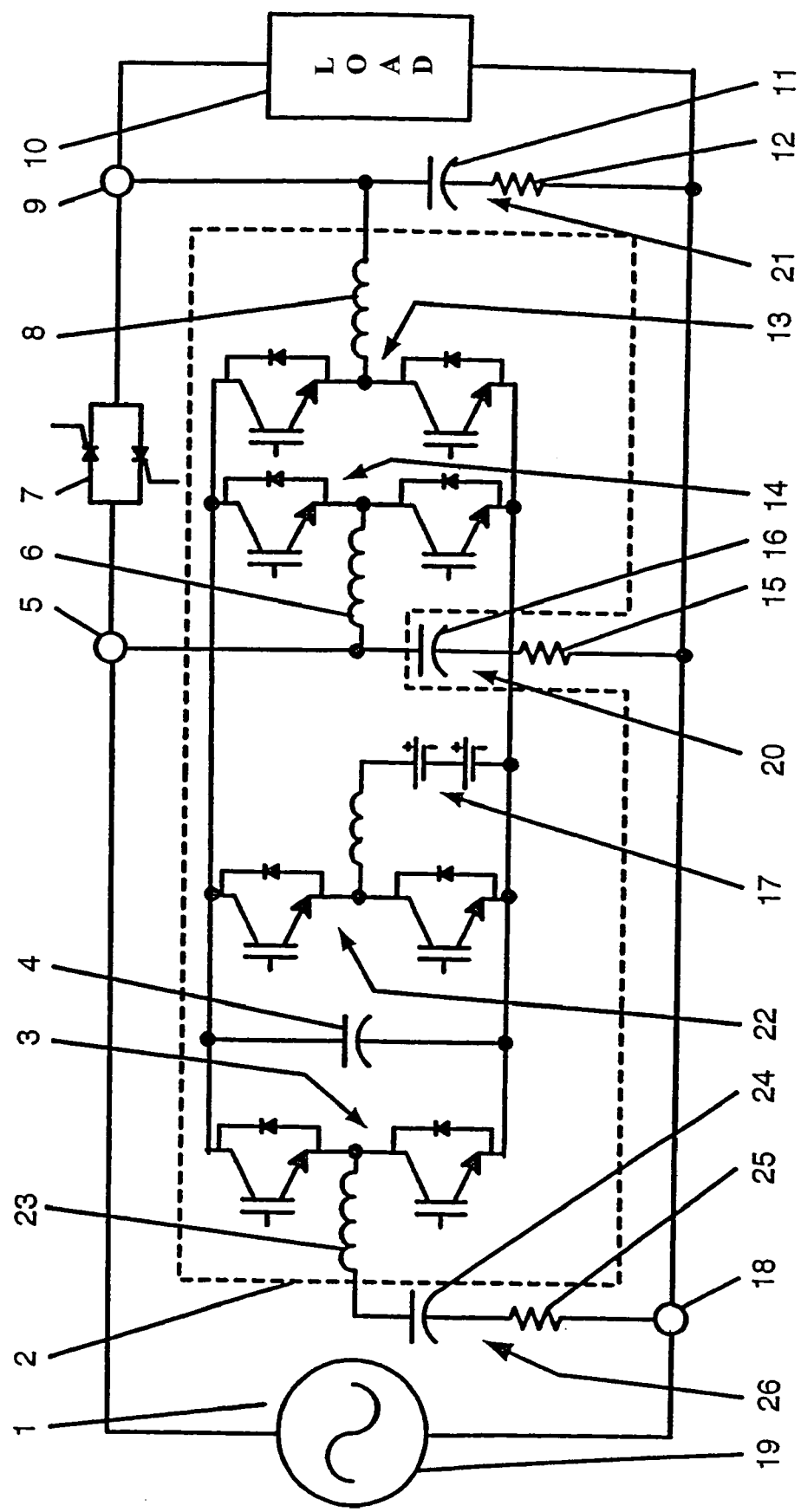
FIG. 2 shows a second embodiment of an apparatus according to the invention for the voltage maintenance of an electrical AC voltage supply network, in particular for a single-phase electrical AC voltage supply network.

In a second embodiment of the apparatus for the voltage maintenance of an electrical AC voltage supply network 1, in particular for a single-phase electrical AC voltage supply network 1, in accordance with FIG. 2, the partial converter system has a fourth branch pair 22, which is formed from two series-connected driveable power semiconductor switches with in each case a diode reverse-connected in parallel with each power semiconductor switch and is connected in parallel with the other branch pairs 13, 14, 3. In contrast to the first embodiment of the apparatus in accordance with FIG. 1, the battery store 17 of the partial converter system 2 in accordance with FIG. 2 is connected to the fourth branch pair 22. Preferably, the battery store 17 is connected in parallel with a driveable power semiconductor switch of the fourth branch pair 22 via an inductance. The fourth branch pair 22 advantageously makes it possible, by corresponding driving of the power semiconductor switches of the fourth branch pair 22, to charge the battery store 17 for example in the case of normal operation of the electrical AC voltage supply network 1 as already mentioned above, i.e. when there is no fall in voltage of the voltage source 19. In the event of a fall in voltage of the voltage source 19, electrical energy can then be provided from the battery store 17 by corresponding driving of the power semiconductor switches of the fourth branch pair 22 in a targeted manner, i.e. as required or depending on the magnitude and the time duration of the fall in voltage, as a result of which it is advantageously possible to achieve a further lengthening of the period of time of backup of the voltage at the first terminal 9 in the event of a fall in voltage of the voltage source 19. Furthermore, by means of the fourth branch pair 22, the voltage of the battery store 17 can be chosen to be small, so that no or only a small number of series-connected battery cells of the battery store 17 are required. Moreover, by setting the voltage of the battery store 17 by means of the fourth branch pair 22, the service life of the battery store 17 can advantageously be lengthened.

In order to improve the supply network perturbations, i.e. in order to reduce undesirable oscillations, in particular harmonics with regard to the voltage of the voltage source 19, caused by the apparatus according to the invention, a first filter 20 shown in FIG. 1 and in FIG. 2 is optionally connected in between the third terminal 18 and the second terminal 5, which filter is formed by a first filter capacitance 16 and a first filter resistance 15 connected in series therewith. Furthermore, a second filter 21 formed by a second filter capacitance 11 and a second filter resistance 12 connected in series therewith is optionally connected in between the third terminal 18 and the first terminal 9. Said second filter 21 advantageously serves for generating an as far as possible sinusoidal voltage at the first terminal 9. Furthermore, a third filter 26 formed by a third filter capacitance 24 and a third filter resistance 25 connected in series therewith is optionally connected in between the third terminal 18 and the third inductance 23. Said third filter 26 likewise advantageously serves for generating an as far as possible sinusoidal voltage at the first terminal 9.

Figure 3:
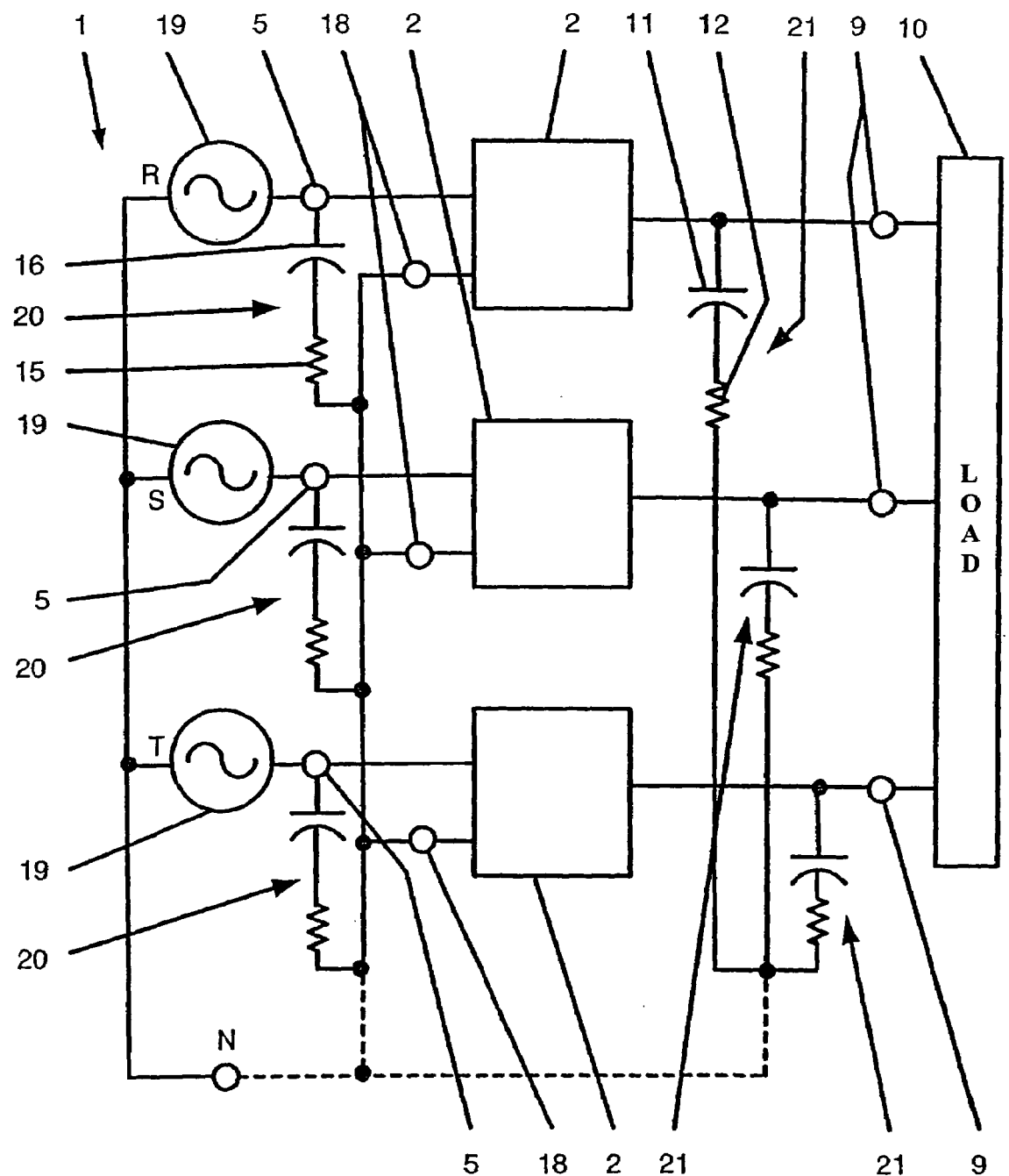
FIG. 3 shows a third embodiment of an apparatus according to the invention for the voltage maintenance of an electrical AC voltage supply network, in particular for a polyphase electrical AC voltage supply network.

FIG. 3 shows a third embodiment of the apparatus according to the invention for the voltage maintenance of the electrical AC voltage supply network 1, in particular for a polyphase electrical AC voltage supply network 1, the electrical AC voltage supply network 1 in accordance with FIG. 3 being embodied by way of example in three-phase fashion, i.e. with three phases R, S, T and with a respective voltage source 19 associated with each phase R, S, T. For each phase R, S, T, provision is made of a partial converter system 2 in accordance with the above-described embodiments in accordance with FIG. 1 or FIG. 2, the third terminals 18 preferably being connected to one another. Furthermore, in accordance with FIG. 3, in the case of each partial converter system 2, the first filter 20 is connected between the first terminal 5 and the third terminal 18. As a result of the third terminals 18 preferably being connected to one another in accordance with FIG. 3 and as a result of the first filters 20 connected between the second terminals 5 and the third terminals 18, all of the first filters 20 in accordance with FIG. 3 are also connected to one another. As an alternative to FIG. 3, the first filter 20 is connected only to the second terminal 5 of each partial converter system 2, the first filters 20 being connected to one another and the third terminals 18 preferably being connected to one another. With regard to the filters 20, such an arrangement of the first filters 20 is shown for example in a fourth embodiment of the apparatus according to the invention for the voltage maintenance of the electrical AC voltage supply network 1, the fourth embodiment of the apparatus according to the invention being described in detail later below.

Moreover, in the case of the embodiment of the apparatus in accordance with FIG. 3, in the case of each partial converter system 2, a second filter 21 is connected to the first terminal 9, the second filter 21, as already described, being formed by a second filter capacitance 11 and a second filter resistance 12 connected in series therewith. The second filters 21 are connected to one another in accordance with FIG. 3. The third filter 26 of the partial converter system 2 in accordance with FIG. 1 and FIG. 2 may advantageously optionally be omitted in the case of the embodiment in accordance with FIG. 3. Furthermore, all of the voltage sources 19 are connected to one another and form a neutral point terminal N at the junction point. The neutral point terminal N in accordance with FIG. 3 is optionally connected to the junction point of the third terminals 18 and to the junction point of the second filters 21, this optional connection being represented by the connection depicted by broken lines in FIG. 3. In addition to the advantages already mentioned in the case of the embodiments in accordance with FIG. 1 and FIG. 2, in the case of the embodiment according to FIG. 3, each first filter 20 and each second filter 21 is advantageously at the potential of the neutral point terminal N of the voltage sources 19 as a result of the optional connection. By way of example, if the neutral point terminal N is far removed from the third terminals 18 or the first filters 20 or the second filters 21 and is thus accessible only with difficulty or inaccessible, then the connection can be dispensed with.

Figure 4:
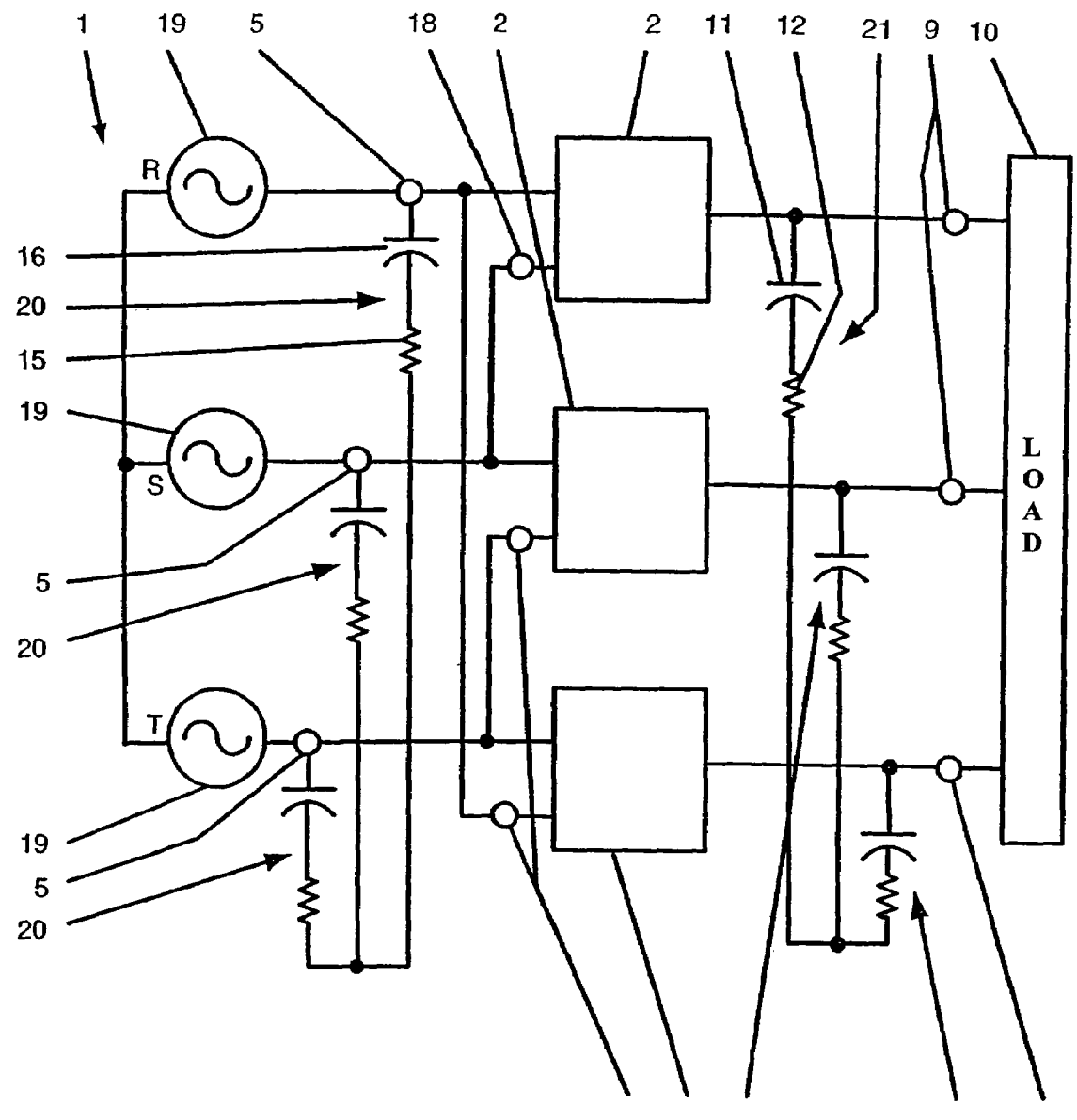
FIG. 4 shows a fourth embodiment of an apparatus according to the invention for the voltage maintenance of an electrical AC voltage supply network, in particular for a polyphase electrical AC voltage supply network.

FIG. 4 illustrates the fourth embodiment of the apparatus according to the invention for the voltage maintenance of the electrical AC voltage supply network 1, in particular for a polyphase electrical AC voltage supply network 1, which apparatus differs from the above-described embodiment in accordance with FIG. 3 to the effect that each third terminal 18 of an associated partial converter system 2 of one phase R, S, T is connected to a second terminal 5 of a partial converter system 2 of another phase R, S, T. In accordance with FIG. 4, the first filter 20 is connected to the second terminal 5 of each partial converter system 2, the first filters 20 being connected to one another. Furthermore, in accordance with FIG. 4, in the case of each partial converter system 2, the second filter 21 is connected to the first terminal 9, the second filters 21 being connected to one another. Besides the advantages of the embodiment in accordance with FIG. 3, the advantages of the embodiment of the apparatus according to FIG. 4 additionally lie in the fact that the connection of the third terminals 18 and the junction point of the second filters 21 in each case to the neutral point terminal N can be dispensed with. Furthermore, in the event of a fall in voltage of the voltage source 19 in one of the phases R, S, T, energy can be drawn from a voltage source 19 of another phase R, S, T, which can then advantageously be used, as already described in the case of the embodiments in accordance with FIG. 1 and FIG. 2, for backing up the voltage at the first terminal 9 of the partial converter system 2 of the phase R, S, T affected by the fall in voltage.

It is also the case for the embodiments in accordance with FIG. 3 and FIG. 4 that the driveable isolating switch 7 is connected in between the first terminal 9 is and the third terminal 5, but said isolating switch is not illustrated in FIG. 3 and FIG. 4 for the sake of clarity.

It has proved to be particularly advantageous to select the first filter resistance 15, the second filter resistance 12 and the third filter resistance 25 in each case in the range from 0 ohms to 1000 ohms.

Overall, the apparatus according to the invention manages with a small space requirement, is distinguished by a small outlay on material, mounting and busbar arrangement and is thus very simple, does not require intensive maintenance and is cost-effective. Moreover, the apparatus according to the invention in accordance with the embodiments of FIG. 3 or FIG. 4 makes it possible to influence the voltage in one or more phases R, S, T if an overvoltage occurs in one or more of said phases R, S, T. In this case, the partial converter system 2 feeds electrical energy from the affected phase or phases R, S, T into the electrical energy store 4 and/or into the battery store 17, so that the overvoltage can advantageously be reduced.

In the case of the method according to the invention for operating the apparatus according to the invention for the voltage maintenance of the electrical AC voltage supply network 1, in the event of a fall in voltage of the voltage source 19 of the electrical AC voltage supply network 1, the first and second branch pairs 13, 14 of the partial converter system 2 are driven in such a way that essentially the rated voltage of the associated voltage source 19 is established at the first terminal 9, and, in particular in the case of a single-phase electrical AC voltage supply network 1, between the first terminal 9 and the third terminal 18 of the partial converter system 2. This setting is advantageously achieved by virtue of the fact that a compensation voltage is impressed between the first terminal 9 and the second terminal 5 of the partial converter system 2 and can compensate for the fall in voltage. The second and third branch pairs 14, 3 are furthermore driven in such a way that the electrical energy store 4 is charged by the associated voltage source 19. The charging operation of the energy store 4 and the compensation of the fall in voltage preferably proceed essentially at the same time. Electrical energy for charging the energy store 4 can still advantageously be drawn from the faulty or disturbed voltage source 19 by means of this driving of the first, second and third branch pairs 13, 14, 3, while a voltage backup at the first terminal 9 is obtained, in addition, by the setting of the voltage at the first terminal 9 to essentially the value of the rated voltage of the voltage source 19, as a result of which the supply of the electrical load 10 connected to the first terminal 9 can be ensured for a long period of time.

In the text below, firstly the method according to the invention for operating the apparatus according to the invention for the voltage maintenance of the electrical AC voltage supply network 1 is explained in more detail for the case of no fall in voltage of the voltage source 19. In normal operation of the electrical AC voltage supply network 1, i.e. when there is no fall in voltage of the voltage source 19, the driveable isolating switch 7 connected in between the first terminal 9 and the third terminal 18 is closed according to the invention. According to the embodiment of the apparatus according to the invention in accordance with FIG. 1, the second and third branch pairs 14, 3, or, according to the embodiments of the apparatus according to the invention in accordance with FIG. 3 or FIG. 4, each second and third branch pair 14, 3, in the event of no fall in voltage of the associated voltage source 19, is driven according to the invention in such a way that the electrical battery store 17 that is preferably provided for each partial converter system 2 and is connected in parallel with the respective branch pairs 13, 14, 3 is charged by the associated voltage source 19. This advantageously makes use of the fact that, in the event of no fault of the voltage source 19, enough electrical energy is available from the respective voltage source 19 for charging the corresponding battery store 17 and, consequently, in addition to the electrical energy store 4, electrical energy can additionally be stored which, in the event of a fall in voltage of the voltage source 19, can additionally be provided for backing up the voltage at the first terminal 9.

Furthermore, according to the method according to the invention, in the case of an apparatus in accordance with FIG. 2, the fourth branch pair 22 of the partial converter system 2, or the fourth branch pair 22 of each partial converter system 2 in the case of an apparatus in accordance with FIG. 3 or FIG. 4 with partial converter systems 2 according to FIG. 2, in the event of no fall in voltage of the associated voltage source 19, is driven in such a way that the battery store 17 connected to the fourth branch pair 22 is charged. This likewise, as already mentioned above for the battery store 17 connected in parallel with the branch pairs 13, 14, 3 in accordance with FIG. 1, advantageously makes use of the fact that, in the event of no fault of the voltage source 19, enough electrical energy is available from the respective voltage source 19 for charging the corresponding battery store 17 and, consequently, in addition to the electrical energy store 4, electrical energy can additionally be stored. In the event of a fall in voltage of the voltage source 19, electrical energy can then advantageously be provided from the battery store 17 by corresponding driving of the power semiconductor switches of the fourth branch pair 22 additionally in a targeted manner in order to back up the voltage at the first terminal 9 in the event of a fall in voltage of the voltage source 19. Furthermore, by means of the fourth branch pair 22, the voltage of the battery store 17 can be chosen to be small, so that no or only a small number of series-connected battery cells of the battery store 17 are required. Moreover, as a result of the setting of the voltage of the battery store 17 by means of the fourth branch pair 22, the service life of the battery store 17 can advantageously be lengthened.

Furthermore, in the event of no fall in voltage of the associated voltage source 19, the first branch pair 13 and the second branch pair 14 of the partial converter system 2 in accordance with FIG. 1 or FIG. 2 or of each partial converter system 2 in accordance with FIG. 3 or FIG. 4 are driven synchronously and the third branch pair 3 of the partial converter system 2 in accordance with FIG. 1 or FIG. 2 or of each partial converter system 2 in accordance with FIG. 3 or FIG. 4 is driven in such a way that at least one harmonic oscillation—with regard to the voltage of the associated voltage source 19—of the voltage present at the first terminal 9 of the or of each partial converter system 2 is essentially compensated for. As a result, it is possible to carry out a targeted active filtering out of an oscillation of an arbitrarily adjustable frequency of the voltage present at the first terminal 9 of the or of each partial converter system 2 and of the current flowing via the first terminal 9 of the or of each partial converter system 2. Moreover, the power factor on the supply network side can advantageously be controlled.

Furthermore, in the event of no fall in voltage of the associated voltage source 19, the first branch pair 13 and the second branch pair 14 of the partial converter system 2 in accordance with FIG. 1 or FIG. 2 or of each partial converter system 2 in accordance with FIG. 3 or FIG. 4 are driven synchronously and the third branch pair 3 of the partial converter system 2 in accordance with FIG. 1 or FIG. 2 or of each partial converter system 2 in accordance with FIG. 3 or FIG. 4 is driven in such a way that an adjustable value of a reactive power flowing via the first terminal 9 of the or of each partial converter system 2 is essentially compensated for. As a result, it is possible to carry out targeted influencing of the reactive power flow via the first terminal 9, in particular a targeted power factor correction, the apparatus according to the invention being operated as a phase shifter.

Furthermore, in the event of no fall in voltage of the associated voltage source 19, the first branch pair 13 and the second branch pair 14 of the partial converter system 2 in accordance with FIG. 1 or FIG. 2 or of each partial converter system 2 in accordance with FIG. 3 or FIG. 4 are driven synchronously and the third branch pair 3 of the partial converter system 2 in accordance with FIG. 1 or FIG. 2 or of each partial converter system 2 in accordance with FIG. 3 or FIG. 4 is driven in such a way that a voltage present at the electrical energy store 4 is corrected to a predeterminable desired value. The correction makes it possible to ensure that the prodeterminable desired value of the voltage is essentially always present at the electrical energy store 4 and this voltage can thus be switched without difficulty by the power semiconductor switches of the first, second and third branch pairs 13, 14, 3 without requiring further protective precautions for the power semiconductor switches of the branch pairs 13, 14, 3, for example by design for a high overvoltage.

In the text below, the method according to the invention for operating the apparatus according to the invention for the voltage maintenance of the electrical AC voltage supply network 1 is described in more detail in the event of the fall in voltage of the voltage source 19, the method steps specified below, when referring to components of the apparatus according to the invention without explicitly specifying an embodiment of the apparatus, relating to all of the embodiments of the apparatus in accordance with FIG. 1 to FIG. 4. Firstly, upon the occurrence of the fall in voltage of the corresponding voltage source 19 of the associated partial converter system 2, the isolating switch 7 is opened and then, as already mentioned above, the first branch pair 13 and the second branch pair 14 are driven in such a way that essentially the rated voltage of the voltage source 19 is set at the first terminal 9. The second and third branch pairs 14, 3 are furthermore driven in such a way that the electrical energy store 4 is charged, preferably continuously, by the associated voltage source 19. The charging operation and the compensation of the fall in voltage preferably proceed essentially at the same time.

Preferably, when the isolating switch 7 is opened, the first branch pair 13 and the second branch 14 are driven in such a way that a current flowing via the isolating switch 7, in particular an opening current, is taken essentially to the value 0A within less than or equal to 1 ms. In this case, this current is advantageously conducted into the energy store 4, as a result of which the isolating switch 7 is loaded to a lesser extent upon opening.

Furthermore, a current flowing via the second terminal 5 is smoothed by means of the first inductance 6. As a result, undesirable oscillations in this current can advantageously be reduced, so that overall an essentially sinusoidal profile of this current is produced.

According to the invention, at least one harmonic with regard to the voltage of the voltage source 19 is essentially filtered out by means of the first filter 20. As a result, supply network perturbations of the apparatus according to the invention can advantageously be improved, i.e. undesirable oscillations, in particular harmonics with regard to the voltage of the voltage source 19, can be reduced.

Furthermore, a current flowing via the first terminal 9 is smoothed by means of the second inductance 8, as a result of which undesirable oscillations in this current can advantageously be reduced, so that overall an essentially sinusoidal profile of this current is produced.

with reference to the embodiments of the apparatus according to the invention according to FIG. 1 and FIG. 2, according to the invention, for a single-phase electrical AC voltage supply network 1, at least one harmonic with regard to the voltage of the voltage source 19 is essentially filtered out by means of the second filter 21. In an advantageous manner, as a result, undesirable oscillations, in particular harmonics with regard to the voltage of the voltage source 19, can be reduced on the load side and, consequently, an as far as possible sinusoidal voltage can be produced at the first terminal 9.

Furthermore, a current flowing via the third terminal 18 is smoothed by means of the third inductance 8, as a result of which undesirable oscillations in this current can advantageously be reduced, so that overall an essentially sinusoidal profile of this current is produced.

With reference to the embodiments of the apparatus according to the invention according to FIG. 1 and FIG. 2, according to the invention, for a single-phase electrical AC voltage supply network 1, at least one harmonic with regard to the voltage of the voltage source 19 is essentially filtered out by means of the third filter 26. In an advantageous manner, as a result, undesirable oscillations, in particular harmonics with regard to the voltage of the voltage source 19, can be reduced on the load side and, consequently, likewise an as far as possible sinusoidal voltage can be produced at the first terminal 9.

With reference to the embodiments of the apparatus according to the invention according to FIG. 3, according to the invention, for a polyphase electrical AC voltage supply network 1, a partial converter system 2 and in each case a voltage source 19 connected thereto are provided for each phase R, S, T, in which case, in the case of each partial converter system 2, at least one harmonic with regard to the voltage of the associated voltage source 19 is essentially filtered out by means of the first filter 20, which is connected in between the third terminal 18 and the second terminal 5. In this case, the third terminals 18 are connected to one another in accordance with FIG. 3. As an alternative with regard to FIG. 3 and with reference to FIG. 4, at least one harmonic with regard to the voltage of the associated voltage source 19 is essentially filtered out by means of the first filter 20, which is connected to the second terminal 5, the first filters 20 being connected to one another. Consequently, undesirable supply network perturbations, in particular harmonics with regard to the voltage of the voltage source 19, can advantageously be reduced also for the electrical AC voltage supply network 1 of polyphase design.

With reference to the embodiments of the apparatus according to the invention according to FIG. 3 and FIG. 4, according to the invention, for a polyphase electrical AC voltage supply network 1, in the case of each partial converter system 2, at least one harmonic with regard to the voltage of the associated voltage source 19 is essentially filtered out by means of the second filter 21 connected to the first terminal 9, the second filters 21 being connected to one another. As a result, in an advantageous manner, also for the electrical AC voltage supply network 1 of polyphase design, undesirable oscillations, in particular harmonics with regard to the voltage of the voltage source 19, can be reduced on the load side and, consequently, an as far as possible sinusoidal voltage can be produced at the respective first terminal 9.

Overall, the method according to the invention for operating the apparatus according to the invention for the voltage maintenance of the electrical AC voltage supply network 1 constitutes a particularly simple and cost-effective solution, with which the apparatus can be operated simply and efficiently advantageously both in the event of a fall in voltage of a voltage source 19 and in the event of no fall in voltage of the voltage source 19, so that an adequate supply of the electrical load 10 can be ensured at any time.

List of Reference Symbols

1 AC voltage supply network
2 Partial converter system
3 Third branch pair
4 Electrical energy store
5 Second terminal
6 First inductance
7 Driveable isolating switch
8 Second inductance
9 First terminal
10 Electrical load
11 Second filter capacitance
12 Second filter resistance
13 First branch pair
14 Second branch pair
15 First filter resistance
16 First filter capacitance
17 Battery store
18 Third terminal
19 Voltage source
20 First filter
21 Second filter
22 Fourth branch pair
23 Third inductance
24 Third filter capacitance
25 Third filter resistance
26 Third filter

The invention claimed is:

1. An apparatus for the voltage maintenance of an electrical AC voltage supply network with a partial converter system, comprising:
a first branch pair and a second branch pair connected in parallel therewith and an electrical energy store connected in parallel with the branch pairs, each branch pair being formed from two series-connected driveable power semiconductor switches with in each case a diode is reverse-connected in parallel with each power semiconductor switch, and the junction point of the power semiconductor switches of the first branch pair is connected to a first terminal of the partial converter system and the junction point of the power semiconductor switches of the second branch pair is connected to a second terminal of the partial converter system, wherein the partial converter system has a third branch pair formed from two series-connected driveable power semiconductor switches with in each case a diode is reverse-connected in parallel with each power semiconductor switch, the third branch pair being connected in parallel with the first and second branch pairs, and
wherein the junction point of the power semiconductor switches of the third branch pair is connected to a third terminal of the partial converter system,
wherein a driveable isolating switch is connected between the first terminal and the second terminal.

2. The apparatus as claimed in claim 1, wherein a first inductance is connected between the junction point of the power semiconductor switches of the third branch pair and the second terminal.

3. The apparatus as claimed in claim 2, wherein a first filter formed by a first filter capacitance and a first filter resistance connected in series therewith is connected in between the third terminal and the second terminal.

4. The apparatus as claimed in claim 1, wherein a second inductance is connected between the junction point of the power semiconductor switches of the first branch pair and the first terminal.

5. Apparatus as claimed in claim 4, wherein a second filter formed by a second filter capacitance and a second filter resistance connected in series therewith is connected in between the third terminal and the first terminal.

6. The apparatus as claimed in claim 1, wherein a third inductance is connected between the junction point of the power semiconductor switches of the third branch pair and the third terminal.

7. The apparatus as claimed in claim 6, wherein a third filter formed by a third filter capacitance and a third filter resistance connected in series therewith is connected between the third terminal and the third inductance.

8. The apparatus as claimed in claim 2, wherein, for a polyphase electrical AC voltage supply network, a partial converter system is provided for each phase and wherein the third terminals are connected to one another.

9. The apparatus as claimed in claim 2, wherein, for a polyphase electrical AC voltage supply network, a partial converter system is provided for each phase, and wherein each third terminal of an associated partial converter system of one phase is connected to a second terminal of a partial converter system of another phase.

10. The apparatus claimed in claim 2, wherein, for a polyphase electrical AC voltage supply network, a partial converter system is provided for each phase,
wherein a first filter formed by a first filter capacitance and a first filter resistance connected in series therewith is connected to the second terminal, and wherein the first filters are connected to one another.

11. The apparatus as claimed in claim 4, wherein, for a polyphase electrical AC voltage supply network, a partial converter system is provided for each phase,
wherein a first filter formed by a first filter capacitance and a first filter resistance connected in series therewith is connected between the third terminal and the second terminal of each partial converter system.

12. The apparatus as claimed in claim 4, wherein, for a polyphase electrical AC voltage supply network, a partial converter system is provided for each phase,
wherein a second filter formed by a second filter capacitance and a second filter resistance connected in series therewith is connected to the first terminal of each partial converter system, and
wherein the second filters are connected to one another at a junction point.

13. The apparatus as claimed in claim 8, wherein the voltage sources of the partial converter systems are connected to one another and the junction point forms a neutral point terminal, the junction point of the third terminals being connected to the neutral point terminal.

14. The apparatus as claimed in claim 12, wherein the voltage sources of the partial converter systems are connected to one another to form a neutral point terminal, the junction point of the second filters being connected to the neutral point terminal.

15. The apparatus as claimed in claim 1, wherein a capacitor is provided as electrical energy store.

16. The apparatus as claimed in claim 1, wherein the partial converter system has an electrical battery store connected in parallel with the branch pairs.

17. The apparatus as claimed in claim 1, wherein the partial converter system has a fourth branch pair formed from two series connected driveable power semiconductor switches with in each case a diode reverse connected in parallel with each power semiconductor switch, the fourth branch pair being connected in parallel with the other branch pairs, and wherein a battery store is connected to the fourth branch pair.

18. A method for operating an apparatus for the voltage maintenance of an electrical AC voltage supply network, comprising the steps of:
in the event of a fall in voltage of a voltage source of the electrical AC voltage supply network, said voltage source being connected to the partial converter system, driving the partial converter system in such a way that essentially the rated voltage of the voltage source is established at a first terminal of the partial converter system, the partial converter system comprising a first branch pair and a second branch pair connected in parallel therewith and an electrical energy store connected in parallel with the branch pairs, and each branch pair being formed from two series connected driveable power semiconductor switches with in each case a diode is reverse-connected in parallel with each power semiconductor switch, and the junction point of the power semiconductor switches of the first branch pair is connected to a first terminal of the partial converter system and the junction point of the power semiconductor switches of the second branch pair is connected to a second terminal of the partial converter system;
driving the first branch pair and the second branch pair in such a way that essentially the rated voltage of the voltage source is set at the first terminal; and
driving the second branch pair and a third branch pair of the partial converter system, which is formed from two series-connected driveable power semiconductor switches with in each case a diode reverse-connected in parallel with each power semiconductor switch and is connected in parallel with the first and second branch pairs, the junction point of the power semiconductor switches of the third branch pair being connected to a third terminal of the partial converter system, in such a way that the electrical energy store is charged by the voltage source, wherein, when the fall in voltage of the voltage source occurs, opening a driveable isolating switch connected between the first terminal and the second terminal.

19. The method as claimed in claim 18 wherein, upon the opening of the isolating switch, driving the first branch pair and the second branch pair in such a way that a current flowing via the isolating switch is taken essentially to the value 0A within less than or equal to 1 ms.

20. The method as claimed in claim 18, wherein a current flowing via the second terminal is smoothed by means of a first inductance connected in between the junction point of the power semiconductor switches of the second branch pair and the second terminal.

21. The method as claimed in claim 20, wherein at least one harmonic with regard to the voltage of the voltage source is essentially filtered out by means of a first filter, which is connected in between the third terminal and the second terminal and is formed by a first filter capacitance and a first filter resistance connected in series therewith.

22. The method as claimed in claim 18, wherein a current flowing via the first terminal is smoothed by means of a second inductance connected in between the junction point of the power semiconductor switches of the first branch pair and the first terminal.

23. The method as claimed in claim 22, wherein at least one harmonic with regard to the voltage of the voltage source is essentially filtered out by means of a second filter, which is connected in between the third terminal and the first terminal and is formed by a second filter capacitance and a second filter resistance connected in series therewith.

24. The method as claimed in claim 18, wherein a current flowing via the third terminal is smoothed by means of a third inductance connected in between the junction point of the power semiconductor switches of the third branch pair and the third terminal.

25. The method as claimed in claim 24, wherein at least one harmonic with regard to the voltage of the voltage source is essentially filtered out by means of a third filter, which is connected in between the third terminal and the third inductance and is formed by a third filter capacitance and a third filter resistance connected in series therewith.

26. The method as claimed in claim 18, wherein, for a polyphase electrical AC voltage supply network, a partial converter system and in each case a voltage source connected thereto are provided for each phase and, in the case of each partial converter system, at least one harmonic with regard to the voltage of the associated voltage source is essentially filtered out by means of a first filter, which is connected in between the third terminal and the second terminal and is formed by a first filter capacitance and a first filter resistance connected in series therewith, the third terminals being connected to one another.

27. The method as claimed in claim 18, wherein, for a polyphase electrical AC voltage supply network, a partial converter system and in each case a voltage source connected thereto are provided for each phase and, in the case of each partial converter system, at least one harmonic with regard to the voltage of the associated voltage source is essentially filtered out by means of a first filter, which is connected to the second terminal and is formed by a first filter capacitance and a first filter resistance connected in series therewith, the first filters being connected to one another.

28. The method as claimed in claim 18, wherein, for a polyphase electrical AC voltage supply network, a partial converter system and in each case a voltage source connected thereto are provided for each phase and, in the case of each partial converter system, at least one harmonic with regard to the voltage of the associated voltage source is essentially filtered out by means of a second filter, which is connected to the first terminal and is formed by a second filter capacitance and a second filter resistance connected in series therewith, the second filters being connected to one another.

29. The method as claimed in claim 18, wherein, in the event of no fall in voltage of the associated voltage source, the driveable isolating switch is closed.

30. The method as claimed in claim 29, wherein, in the event of no fall in voltage of the associated voltage source, each second and third branch pair is driven in such a way that an electrical battery store, which is provided for each partial converter system and is connected in parallel with the respective branch pairs, is charged by the associated voltage source.

31. The method as claimed in claim 29, wherein, in the event of no fall in voltage of the associated voltage source, a fourth branch pair of each partial converter system, which is formed from two series-connected driveable power semiconductor switches with in each case a diode reverse-connected in parallel with each power semiconductor switch and is connected in parallel with the respective branch pairs, is driven in such a way that a battery store connected to the fourth branch pair is charged.

32. The method as claimed in claim 29, wherein, in the event of no fall in voltage of the associated voltage source, the first branch pair and the second branch pair of each partial converter system are driven synchronously and the third branch pair of each partial converter system is driven in such a way that at least one harmonic oscillation—with regard to the voltage of the associated voltage source of the voltage present at the first terminal of each partial converter system is essentially compensated for.

33. The method as claimed in claim 29, wherein, in the event of no fall in voltage of the associated voltage source, the first branch pair and the second branch pair of each partial converter system are driven synchronously and the third branch pair of each partial converter system is driven in such a way that an adjustable value of a reactive power flowing via the first terminal of each partial converter system is essentially compensated for.

34. The method as claimed in claim 29, wherein, in the event of no fall in voltage of the associated voltage source, the first branch pair and the second branch pair of each partial converter system are driven synchronously and the third branch pair of each partial converter system is driven in such a way that a voltage present at the electrical energy store is corrected to a predeterminable desired value.

35. A method for operating an apparatus for the voltage maintenance of an electrical AC voltage supply network, the apparatus having a partial converter system and the partial converter system having a first branch pair and a second branch pair connected in parallel therewith and an electrical energy store connected in parallel with the branch pairs, and each branch pair being formed from two series-connected driveable power semiconductor switches with in each case a diode reverse-connected in parallel with each power semiconductor switch, and the junction point of the power semiconductor switches of the first branch pair is connected to a first terminal of the partial converter system and the junction point of the power semiconductor switches of the second branch pair is connected to a second terminal of the partial converter system, and the partial converter system having a third branch pair formed from two series-connected driveable power semiconductor switches with in each case a diode reverse-connected in parallel with each power semiconductor switch, the third branch pair being connected in parallel with the first and second branch pairs, and the junction point of the power semiconductor switches of the third branch pair is connected to a third terminal of the partial converter system, in which, in the event of a fall in voltage of a voltage source of the electrical AC voltage supply network, which voltage source is connected to the partial converter system, comprising the steps of:

setting essentially the rated voltage of the voltage source at the first terminal by the partial converter system;

wherein, when the fall in voltage of the voltage source occurs, opening a driveable isolating switch connected in between the first terminal and the second terminal;

impressing a compensation voltage between the first terminal and the second terminal for the purpose of setting the rated voltage by means of the first branch pair and the second branch pair;

charging the energy store with electrical energy from the voltage source by means of the second branch pair and the third branch pair.

\* \* \* \* \*